Feb. 15, 1966   F. B. McDANIEL ET AL   3,234,677
AUTOMOBILE SIGN
Filed Nov. 2, 1964   2 Sheets-Sheet 1
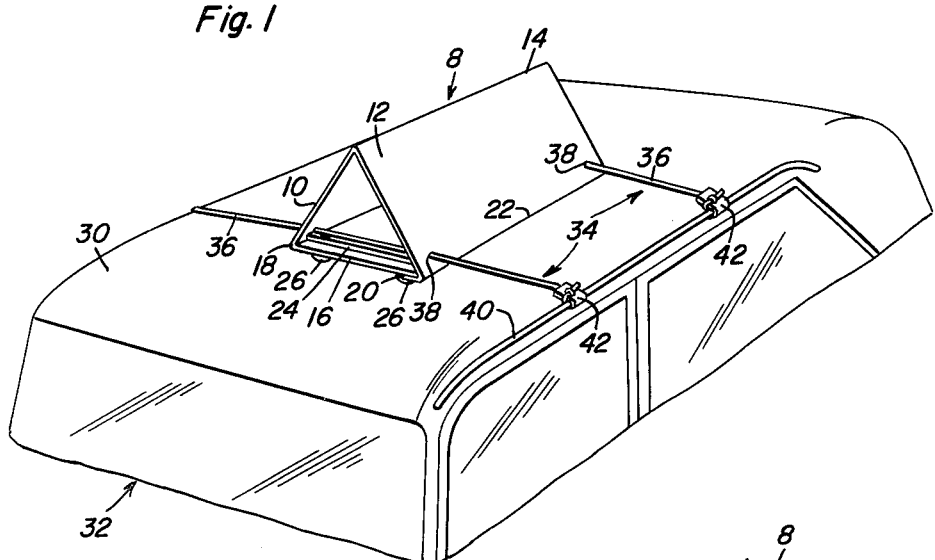
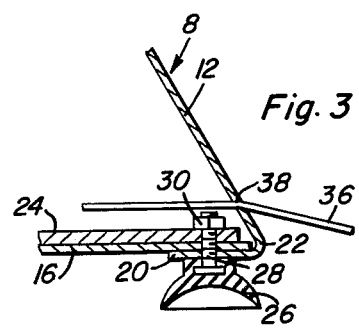
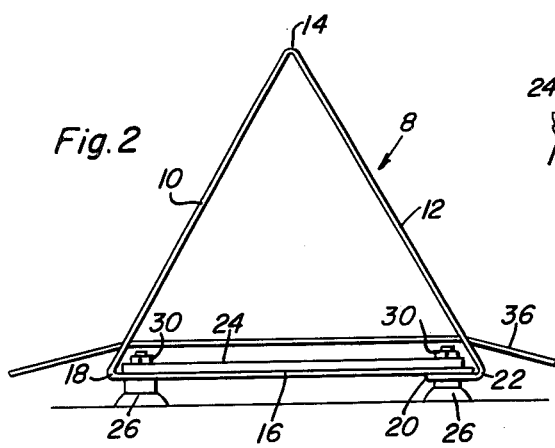
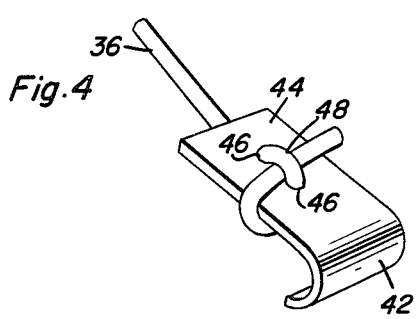
Fred B. McDaniel
Bruce I. Niles
INVENTORS
BY *Clarence A. O'Brien*
*and Harvey B. Jackson*
Attorneys Feb. 15, 1966  F. B. McDANIEL ET AL  3,234,677
AUTOMOBILE SIGN
Filed Nov. 2, 1964  2 Sheets-Sheet 2
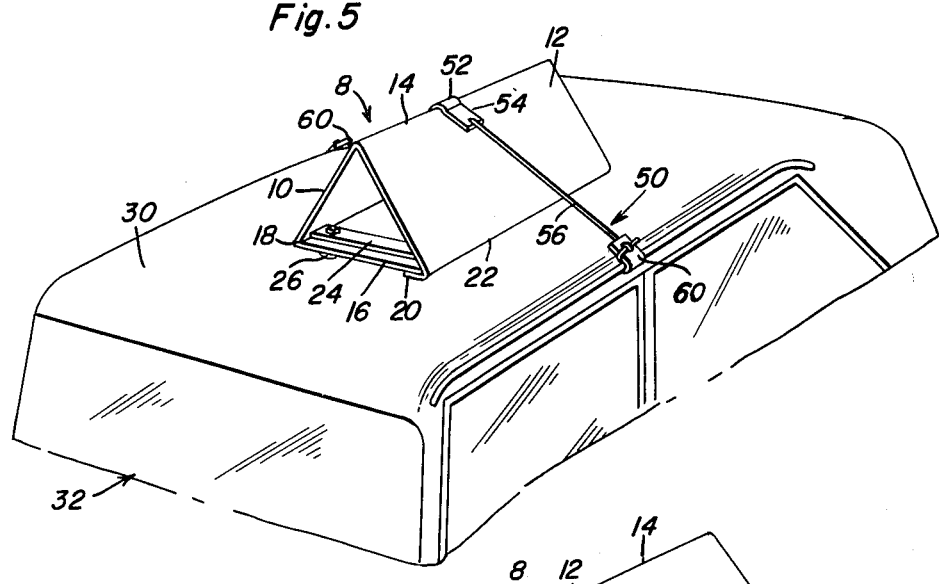
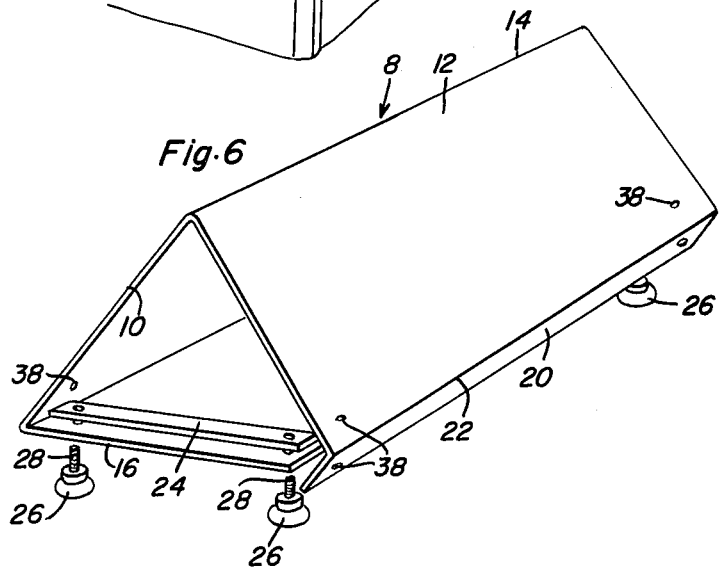
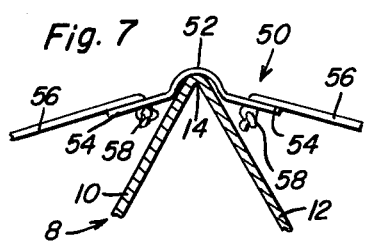
Fred B. McDaniel
Bruce I. Niles
INVENTORS

United States Patent Office 3,234,677
Patented Feb. 15, 1966

3,234,677
AUTOMOBILE SIGN
Fred B. McDaniel and Bruce I. Niles, both of
6513 Atwell, Houston, Tex.
Filed Nov. 2, 1964, Ser. No. 408,249
8 Claims. (Cl. 40—129)

This invention generally relates to new and useful improvements in portable signs particularly for street and highway use and has for its primary object to provide a device of this character which is adapted to be expeditiously mounted on top of an automobile in a manner to be clearly visible from both sides of the vehicle.

Another highly important object of the present invention is to provide, in a manner as hereinafter set forth, an improved portable sign of the aforementioned character comprising novel means for removably but firmly securing the device in the desired position on the vehicle top.

Still another important object is to provide a portable sign of the character set forth which, when it is not in use, may be readily folded or collapsed in a manner to occupy a minimum of space.

Other objects are to provide a portable sign which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a sign embodying the present invention mounted on an automobile top;

FIGURE 2 is a view in end elevation thereof;

FIGURE 3 is a fragmentary view in vertical section on an enlarged scale through a side portion of the device, showing the manner of securing the assembly;

FIGURE 4 is a detail view in perspective of one of the anchoring hooks;

FIGURE 5 is a perspective view substantially similar to FIGURE 1 but showing another embodiment of the invention installed;

FIGURE 6 is a perspective view of the modification per se; and

FIGURE 7 is a fragmentary view in transverse section taken at an intermediate point through the upper portion of the modification.

Referring now to the drawing in detail, it will be seen that reference numeral 8 generally designates an elongated body of substantially triangular transverse section. The body 8, which may be of any desired dimensions, is formed from a single sheet of cardboard, fiberboard or other suitable material. The sheet forming the body 8 is scored along parallel lines to facilitate folding in a manner to provide downwardly divergent or anticlinal side or sign sections or panels 10 and 12 which are hingedly connected at 14. A bottom or base section 16 is hingedly connected at 18 to the lower longitudinal edge of the section 10. Then, an integral flap 20 is hingedly connected at 22 to the lower longitudinal edge of the section 12.

The flap 20 is folded inwardly and underlies the free end portion of the base section 16.

Mounted transversely in the end portions of the body 8 on the base section 16 thereof are strips or bars 24 of fiberboard or other suitable material. Mounted beneath the corner portions of the body 8 are suction cups 26 which are secured in position by bolts 28. Retaining nuts 30 are threaded on the bolts 28. The bolts 28 also secure the bars or strips 24 in position in the body 8. Further, the adjacent bolts 28 also secure the flap 20 beneath the base section 16 of the body 8. This is shown to advantage in FIGURE 3 of the drawing.

The body 8 is adapted to be mounted longitudinally on the top 30 of a motor vehicle body 32 where it is releasably anchored by the suction cups 26. Holddown harnesses 34 further secure the body 8 in position on the vehicle. Each harness 34 includes a holddown cord 36 of suitable material which passes transversely through the body 8 adjacent the ends thereof, the lower portions of the sections 10 and 12 being provided with apertures 38 through which said cord passes. The cords 36 are stretched taut and the ends thereof are detachably and adjustably anchored to the usual rain gutters or channels 40 of the top 30 through the medium of substantially J-shaped hooks 42.

The flat shanks 44 of the hooks 42 are provided with longitudinally spaced holes or openings 46 through which the cord 36 is threaded in a manner to provide upstanding loops 48. The end portion of the cord is folded laterally around one of the longitudinal edges of the shank 44 and inserted through the loop 48 where it is frictionally anchored when said loop is tightened thereon.

It is thought that the use of the sign will be readily apparent from a consideration of the foregoing. Briefly, any desired advertising or other matter may be provided on the display sections or panels 10 and 12 of the triangular body 8. With the device assembly as shown the body 8 is positioned in the desired location on the vehicle top 30 where it is secured in an obvious manner by collapsing the suction cups 26. With the hooks 42 properly adjusted on the cords 36, said cords are stretched taut and said hooks are engaged with the rain channels or gutters 40 of the vehicle. The construction and arrangement is such that there is a minimum of wind resistance. Nevertheless the device is capable of withstanding substantially any wind pressure to which it may be subjected.

In the embodiment of FIGURES 5, 6 and 7 of the drawing, a single harness 50 secures the body 8 in position on the vehicle top in conjunction with the suction cups 26. The harness 50 includes a generally inverted U-shaped saddle or the like 52 (FIGURE 7) which straddles the apex 14 of the body 8. Saddle 52 comprises outwardly bent end portions or legs 54 which are apertured to receive the inner end portions of a pair of cords 56. The cords 56 are inserted through the apertured legs or end portions 54 and knotted as at 58 for anchoring said cords to the saddle. The outer ends of the cords 56 are anchored to the rain channels or gutters 40 of the vehicle through the medium of hooks 60 which are similar in construction and operation to the hooks 42. In other respects this form of the invention is substantially similar in construction and operation to the embodiment of FIGURE 1 of the drawing.

The body 8 is positioned as desired on the vehicle top and secured by the suction cups 26. Saddle 52 is then mounted on top of the body 8 and the cords 56 are stretched taut and secured to the rain channels or gutters 40 of the vehicle by the hooks 60. The saddle 52 is preferably located forwardly of the center of the body 8. Of course, if desired, more than one harness 50 may be employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable sign comprising a tubular body of substantially triangular transverse section and including a sheet folded on spaced, parallel lines and comprising a pair of anticlinal side sections and a base section extending horizontally between the lower portions of said side sections, said sheet further comprising a hinged flap on one of the side sections engaged with the adjacent portion of the base section, stiffening bars traversing the base section in the end portions of the body, spaced suction cups beneath said end portions of said body for removably securing same on a vehicle top, common means for securing the flap, the base section, the stiffening bars and the suction cups together, and means for further securing the body on the vehicle top in conjunction with the suction cups.

2. A portable sign in accordance with claim 1, the first named means including bolts anchored in the suction cups and passing through the base section and the stiffening bars, certain of said bolts also passing through the flap, and retaining nuts threaded on said bolts.

3. A portable sign in accordance with claim 2, the second named means comprising a holddown harness including a transverse cord secured to the body, and an anchor hook on an end portion of the cord engageable with a rain gutter on the body.

4. A portable sign in accordance with claim 3, said hook including a flat shank having spaced openings therein slidably adjustably receiving the cord, said cord including an adjustable loop between the openings adjustably receiving said end portion of the cord and frictionally retaining same.

5. A portable sign comprising a body of generally triangular transverse section for mounting on a vehicle top, and means comprising an inverted generally V-shaped holddown harness for securing the body on the top, said harness including a saddle astraddle the top portion of the body, flexible tension member sections having one pair of corresponding ends connected to said saddle, and anchoring hooks on the other pair of corresponding ends of the tension member sections engageable with rain gutters on the vehicle top.

6. A portable sign comprising a tubular body of substantially triangular transverse section and including a sheet on spaced, parallel lines and comprising a pair of anti-clinal side sections and a base section extending horizontally between the lower portions of said side sections, said sheet further comprising a hinged flap on one of the side sections engaged with the adjacent portion of the base section, stiffening bars transversing the base section in the end portions of the body, spaced suction cups beneath said end portions of said body for removably securing same on a vehicle top, common means for securing the flap, the base section, the stiffening bars and the suction cups together.

7. The combination of claim 5 including suction cup means carried by said body and projecting downwardly therefrom for cushioned engagement with said vehicle top.

8. A portable sign comprising an elongated body constructed of sheet material and having anticlinal longitudinally extending sides, the lower edge portion of one of said sides terminating in a narrow flap extending along said lower edge portion and projecting a short distance toward the lower edge portion of the other side of said body, the last-mentioned edge portion terminating in a wide bottom panel projecting toward the first-mentioned lower edge portion, extending substantially the entire distance between said lower edge portions, and having its free edge portions secured in overlapping engagement with the free edge portion of said flap, and elongated rigid bracing means at each end of said body overlying said bottom, extending substantially the entire distance between said lower edge portions of said sides, and secured, at opposite ends, to said bottom and said flap, a pair of depending opposite side support means at each end of said body adapted for engagement with a vehicle top, each pair of support means being dependingly supported from the opposite ends of the corresponding bracing means.

References Cited by the Examiner

UNITED STATES PATENTS

| | | | |
|---|---|---|---|
| 1,885,282 | 11/1932 | O'Connor | 40—129 |
| 1,942,444 | 1/1934 | O'Connor | 40—129 |
| 2,077,585 | 4/1937 | Rivers | 40—129 |
| 2,836,914 | 6/1958 | Nelson et al. | 40—129 |
| 2,942,367 | 6/1960 | Lee et al. | 40—129 |
| 2,960,786 | 11/1960 | Wagner | 40—129 |
| 3,153,294 | 10/1964 | Hay et al. | 40—129 |

EUGENE R. CAPOZIO, *Primary Examiner.*

LAWRENCE CHARLES, *Examiner.*

SHELDON M. BENDER, *Assistant Examiner.*